Oct. 13, 1942.  T. A. RICE  2,298,723
SAFETY COLLAR
Filed Dec. 9, 1940
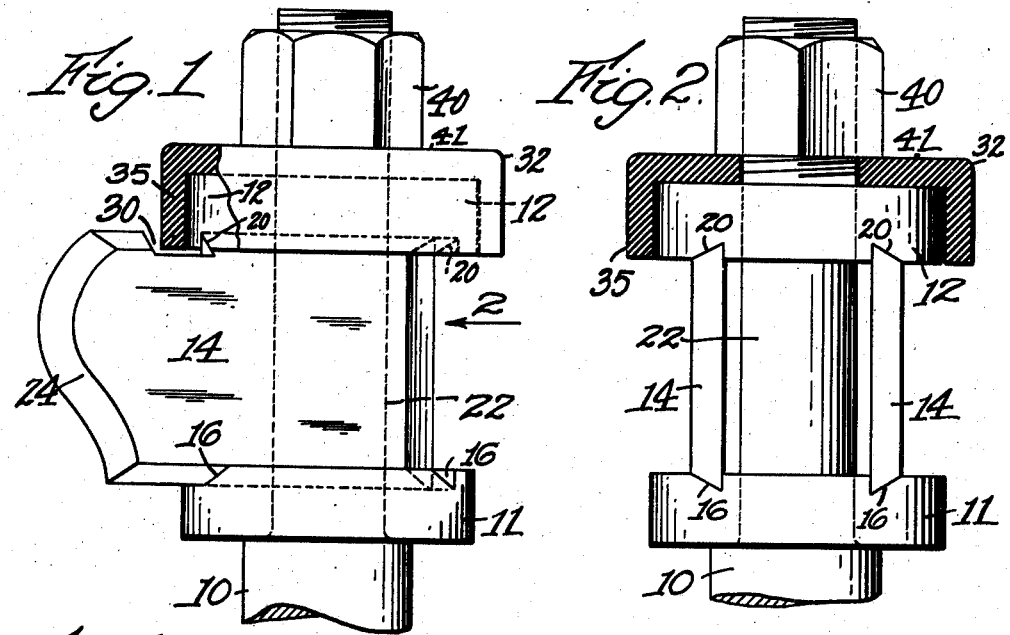
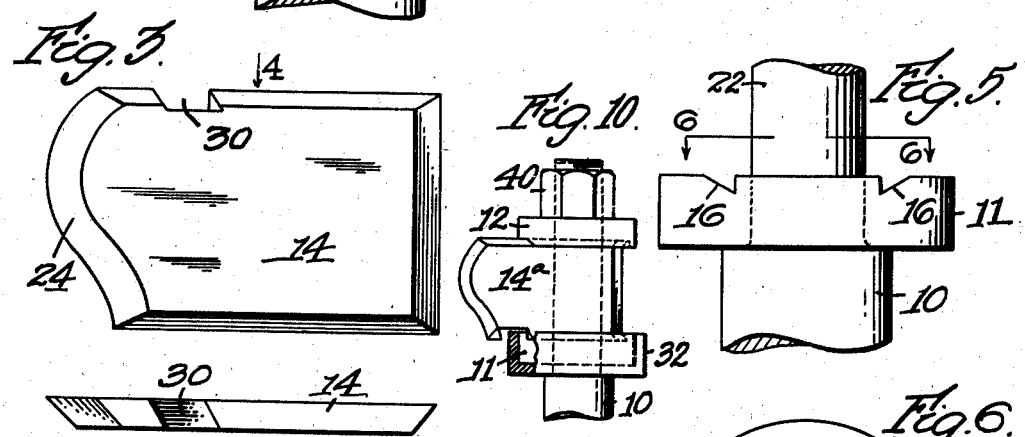
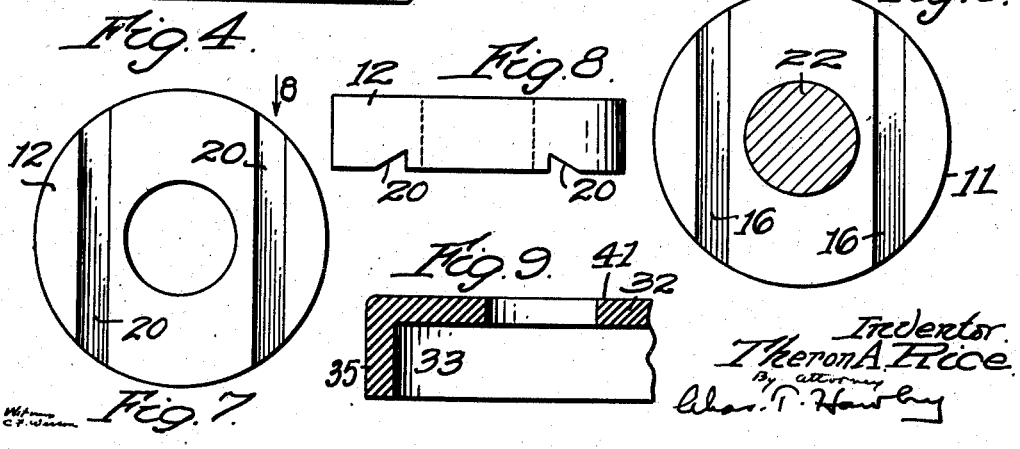

Patented Oct. 13, 1942

2,298,723

UNITED STATES PATENT OFFICE 2,298,723

SAFETY COLLAR

Theron A. Rice, Winchendon, Mass., assignor to Goodspeed Machine Company, Winchendon, Mass., a corporation of Massachusetts Application December 9, 1940, Serial No. 369,331

1 Claim. (Cl. 144—231)

This invention relates to moulding machines and to other similar machines in which cutter heads are rotated at high speed. In such machines, each cutter head usually comprises two or more separate cutter blades which are clamped between axially spaced fixed and movable collars on a cutter spindle. If the cutter blades vary slightly in width, or if the movable collar is not firmly clamped in position, one or more of the cutter blades may work loose and may be thrown out of the machine by centrifugal force, with the possibility of very serious results.

It is the general object of my invention to provide improved means to prevent such accidental escape of a cutter blade from a rotating cutter head.

To the attainment of this general object, I provide a safety collar which coacts with the cutter blades in such manner that accidental escape of a blade becomes substantially impossible.

I further provide a safety collar which may be secured in operative position by the same means which holds the usual movable clamping collar on the spindle.

My invention further relates to arrangements and combinations of parts which will be hereinafter described and more particularly pointed out in the appended claims.

A preferred form of the invention is shown in the drawing, in which:

Fig. 1 is a side view of a cutter head embodying my improvements, with certain parts broken away;

Fig. 2 is an end view of the cutter head, looking in the direction of the arrow 2 in Fig. 1 but showing the safety collar in section;

Fig. 3 is a side view of a cutter blade;

Fig. 4 is a plan view, looking in the direction of the arrow 4 in Fig. 3;

Fig. 5 is a side view of a portion of a cutter spindle;

Fig. 6 is a sectional plan view, taken along the line 6—6 in Fig. 5;

Fig. 7 is a bottom view of a movable clamping collar;

Fig. 8 is a side view, looking in the direction of the arrow 8 in Fig. 7;

Fig. 9 is a sectional view of the safety collar; and

Fig. 10 is a view similar to Fig. 1 but showing certain parts differently arranged.

Referring to Figs. 1 and 2, I have shown a cutter head which is in general of a usual type and which comprises a cutter spindle 10, a fixed clamping collar 11, a movable clamping collar 12 and a pair of cutter blades 14.

The collar 11 (Figs. 5 and 6) is mounted on or fixed to the cutter spindle 10 and is provided with parallel V-shaped grooves 16 to receive the beveled lower edges of the cutter blades 14. The collar 11 may be either integral with the spindle 10 or may be separate therefrom.

The movable collar 12 (Figs. 7 and 8) is provided with similar parallel V-shaped grooves 20 in its lower face, and is axially slidable on the reduced upper end portion 22 of the spindle 10.

The cutter blades 14, when clamped in the grooves 16 and 20 and between the lower fixed collar 11 and the upper movable collar 12, are held in the upright parallel position shown in Figs. 1 and 2, with their shaped cutting edge portions 24 projecting substantially beyond the collars 11 and 12.

For safety purposes, my invention comprises the provision of a notch 30 in the upper edge of each cutter blade 14, which notch is preferably diagonally disposed as shown in Fig. 4. I also provide a safety collar 32 which fits loosely over the upper end portion 22 of the spindle 10. The collar 32 is deeply recessed, as indicated at 33 in Fig. 9, to loosely receive the clamping collar 12 and to provide a depending flange 35 which is positioned in the notches 30 in the cutter blades 14 when the cutter head is assembled.

A clamping nut 40 is threaded on the upper part 22 of the cutter spindle 10 and applies clamping pressure through the flat disc portion 41 of the safety collar 32 to the movable clamping collar 12, which is thus forced firmly against the upper edges of the cutter blades 14.

It will be noted that the flange 35 of the safety collar 32 has no clamping function but clears the bottoms of the notches 30 as clearly shown in Fig. 1. The projection of the flange 35 into the notches 30, however, makes it impossible for a cutter blade to slide or to be thrown radially out of the cutter head, even if the blade becomes substantially loosened from any of the causes previously indicated.

The notches 30 are made of such width that the cutter blades 14 may be adjusted radially in or out to bring both cutter blades to the same cutting radius.

Obviously, the same result may be obtained by inverting the safety collar 32 and placing it below the lower collar 11, as shown in Fig. 10, in which case the cutter blades 14ª will be notched in their lower edges.

My improved safety collar is not only desirable and effective when embodied in new cutter heads but can be readily applied to cutter heads already in use, merely by providing a safety collar of the right internal diameter to receive the usual clamping collar and by notching the cutter blades to receive the depending flange of the safety collar.

My improved construction thus accomplished an extremely desirable result and substantially reduces the risk inherent in the operation of high speed cutter heads, particularly in wood working machines. My improved safety collar is also simple and easy to manufacture and requires no close accuracy in any part to attain entirely satisfactory results.

Having thus described my invention and the advantages thereof, I do not wish to be limited to the details herein disclosed, otherwise than as set forth in the claim, but what I claim is:

In a cutter head comprising a cutter spindle, a lower clamping collar having parallel cutter-holding grooves extending entirely across its upper face, an upper removable clamping collar having parallel cutter-holding grooves extending entirely across its lower face and cutter blades mounted edgewise between said collars and having their top and bottom edges seated in said parallel grooves, that improvement which comprises the provision of a transverse notch in an edge portion of each blade near the cutting end thereof, and the provision of an additional and separate safety collar abutting the ungrooved face of one of said clamping collars and having a flange encircling said collar and projecting beyond the grooved face of said collar into the transverse notches in said blades but spaced from the bottom walls of said notches, and the provision of a single means to secure all of said parts in blade-holding relation on said spindle.

THERON A. RICE.